United States Patent Office 3,245,111
Patented Apr. 12, 1966

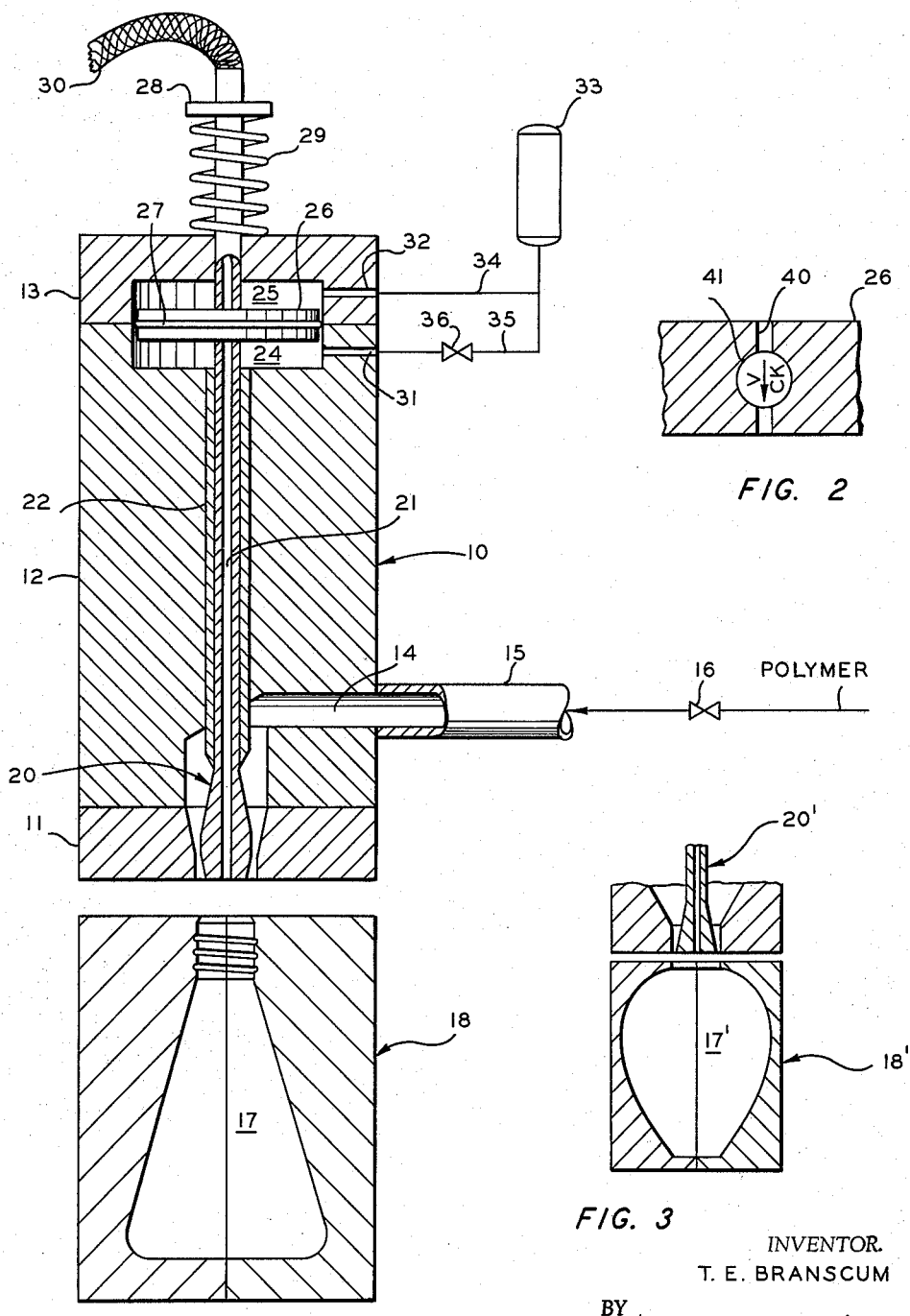

3,245,111
EXTRUSION OF PARISONS AND BLOW MOLDING
Tony E. Branscum, Bartlesville, Okla., assignor to Phillips Petroleum Company, a corporation of Delaware
Filed June 17, 1963, Ser. No. 288,394
6 Claims. (Cl. 18—5)

This invention relates to the formation of parisons of non-uniform wall thickness by the extrusion of thermoplastic materials. In another aspect it relates to the formation of hollow containers having uniform wall thickness by blow molding extruded parisons.

In recent years, a number of materials have been packaged in hollow containers formed of thermoplastic materials. For example, liquid detergents, cosmetics and certain foods are commercially packaged in plastic bottles. Quite often these bottles are formed so that the bases are of larger diameters than the tops to provide stability when the bottles are stored on a flat surface. This non-uniform diameter presents a problem in the manufacturing operation. Most of these bottles are formed by blow molding extruded parisons. If the parison is of uniform diameter, the final bottle will have a thinner wall at the region of larger diameter. This can result in a weak spot or can require excessive plastic material if the parison is made of sufficient thickness to provide the desired strength at the largest diameter section of the bottle.

In accordance with this invention, a procedure is provided for extruding parisons of non-uniform wall thickness. These parisons can be formed so that the region that is to be stretched the most during the blow molding operation is of greater wall thickness, whereby the final container has substantially a uniform wall thickness. This is accomplished by means of a movable mandrel positioned within the die housing. The mandrel and die are of such configuration that the annular die opening changes in size as the mandrel is moved within the die housing. The mandrel is designed so that the flow of thermoplastic material through the die housing tends to force the mandrel outwardly in the direction of plastic flow. The rate at which this movement takes place is adjusted by a hydraulic chamber. By restricting the flow of fluid from the chamber in response to movement of the mandrel, the rate of movement of the mandrel can be controlled in any desired manner.

Accordingly, it is an object of this invention to provide an improved procedure for extruding parisons of non-uniform wall thickness.

Another object is to provide a procedure for blow molding hollow containers having substantially uniform wall thickness.

A further object is to provide novel apparatus for use in extruding and blow molding of thermoplastic materials.

Other objects, advantages and features of the invention should become apparent from the following detailed description, taken in conjunction with the accompanying drawing in which:

FIGURE 1 is a schematic view, shown partially in section, of a first embodiment of the extruding and blow molding apparatus of this invention.

FIGURE 2 illustrates a modified form of the piston employed in the apparatus of FIGURE 1.

FIGURE 3 illustrates a second embodiment of the mandrel configuration.

Referring now to the drawing in detail and to FIGURE 1 in particular, there is shown an extrusion die housing 10 which is formed of three sections 11, 12 and 13 that are secured together by suitable means, such as bolts, not shown. Molten thermoplastic material to be extruded is introduced into a passage 14 of the die housing by means of a conduit 15 which has a control valve 16 therein. Die housing section 11 is provided with a central opening, the lower portion of which is of uniform diameter. The upper portion of this opening tapers outwardly and is in communication with passage 14. The molten plastic material which is extruded through the die enters the cavity 17 which is formed by the two halves of a mold 18. As illustrated, mold 18 is designed to produce a bottle of generally conical configuration.

A mandrel 20, which has a central opening 21 therethrough, is positioned within a sleeve 22 in the die housing. The lower end of the mandrel is provided with a surface which tapers inwardly. Immediately above this surface, the mandrel is of substantially uniform diameter. Above this uniform diameter section, the mandrel tapers inwardly to engage the lower end of sleeve 22.

Die housing sections 12 and 13 are provided with recessed portions which form two chambers 24 and 25, respectively. A piston 26, which can have a piston ring 27 secured thereto, serves to separate chambers 24 and 25. A plate 28 is secured to mandrel 20 above the die housing, and a spring 29 is positioned between plate 28 and the die housing. This spring normally urges the mandrel upwardly to the position illustrated. A flexible conduit 30 is connected to the upper end of the mandrel to supply air or other blowing gas to the interior of mold 18 through passage 21 within the mandrel. Die housing sections 12 and 13 are provided with passages 31 and 32 which connect with respective chambers 24 and 25. A reservoir 33, which is partially filled with hydraulic fluid, is connected to passage 32 by means of a conduit 34 and with passage 31 by means of a conduit 35. Conduit 35 has an adjustable valve 36 therein to control the rate at which fluid is permitted to flow through the conduit.

In the operation of the apparatus illustrated in FIGURE 1, valve 16 is first opened to permit the flow of molten thermoplastic into the die housing. This material flows around mandrel 20 so that a parison is extruded which enters mold 18. The flow of plastic material through the die housing tends to push mandrel 20 downwardly against the force of spring 29. As can be seen from an inspection of the drawing, this downward movement of the mandrel changes the cross-sectional area of the exit port of the die between the mandrel and the die head. Thus, the extruded parison has a wall thickness which diminishes as the die moves downwardly. After the parison has been extruded, valve 16 is closed and air under pressure is directed from hose 30 into the mold through passage 21. This air pressure expands the parison into engagement with the mold to form a bottle having the configuration of the mold. Mandrel 20 can be of such configuration as to engage the upper surface of the mold when the parison has been extruded to cut off further flow. As an alternative, the finished bottle can be cut from the die head by a knife, not shown, after the mold halves have been opened to permit removal of the bottle. In commercial operations, the sequence of events herein described can be accomplished automatically by suitable control equipment, such as described in U.S. Patent 3,044,112.

In order to form a parison having the desired wall thickness, it is essential that the movement of the mandrel be controlled. This is accomplished in accordance with the present invention by means of the piston chamber and hydraulic reservoir. At the start of the extrusion operation, piston 26 is positioned between chambers 24 and 25, as illustrated. Valve 36 is at least partially opened so that hydraulic fluid from reservoir 33 fills chambers 24 and 25. By adjusting the position of valve 36, the rate at which the mandrel descends can be regulated. If the valve is opened wide, the mandrel will descend at a rate which is governed almost entirely by the downward force exerted on the mandrel by the polymer and the resistance offered by spring 29. However, this rate can be slowed substantially by partially closing valve 36 to restrict flow of hydraulic fluid from chamber 24 back to reservoir 33. Thus, any desired rate of descent can readily be obtained by adjustment of valve 36.

In some operations it may be desirable to return the mandrel to the initial position immediately after completion of one cycle of operation. The apparatus illustrated in FIGURE 2 can be employed to permit a more rapid return. A passage 40, which has a check valve 41 therein, is formed in piston 26. During downward movement of the piston, there is no tendency for fluid to flow from chamber 25 to chamber 24 through the check valve because of the high pressure exerted by the piston on chamber 24. However, on the return cycle, fluid is permitted to flow freely from chamber 25 to chamber 24 to speed upward movement of the piston to its initial position.

A second embodiment of the mold and mandrel configuration is illustrated in FIGURE 3. Mold 18' is provided with a cavity 17' to form a vase or other similar article which is of larger diameter at the top than the bottom. Mandrel 20' is designed in this case so that the die opening increases in size as the mandrel is depressed into the mold cavity by the flowing plastic material. It should thus be evident that parisons of different configuration can be formed by changing the design of the mandrel relative to the die housing.

In view of the foregoing description, it can be seen that a method and apparatus are provided for extruding parisons of non-uniform wall thickness. These parisons are particularly useful in the blow molding of hollow containers of non-uniform diameter.

While the invention has been described in conjunction with presently preferred embodiments, it should be evident that it is not limited thereto.

What is claimed is:
1. Parison extrusion apparatus comprising:
a die having a passage therein which extends from an inlet adapted to receive a thermoplastic material to an outlet through which thermoplastic material is extruded;
a mandrel positioned for movement within said passage, said mandrel and said die being of such configuration relative to one another that movement of said mandrel through said passage toward said outlet changes the size of the opening between said mandrel and said outlet, a portion of said mandrel within said passage having an increasing cross-sectional area in a direction extending toward said outlet so that the flow of thermoplastic material from said inlet to said outlet tends to move said mandrel toward said outlet;
means connected to said mandrel to exert a retarding force tending to resist movement of said mandrel toward said outlet responsive to the flow of thermoplastic material through said passage toward said outlet;
means forming a chamber;
a piston positioned for movement in said chamber, said piston engaging the walls of said chamber to divide the chamber into first and second regions;
means connecting said piston to said mandrel so that movement of said mandrel through said passage moves said piston through said chamber;
a source of hydraulic fluid; and
first and second conduit means connecting said source simultaneously to said first and second regions, respectively, whereby the relative sizes of the passages through said conduit means influence the force exerted on said piston tending to restrict movement thereof.
2. Parison extrusion apparatus comprising:
a die having a passage therein which extends from an inlet adapted to receive a thermoplastic material to an outlet through which thermoplastic material is extruded;
a mandrel positioned for movement within said passage, said mandrel being of such configuration that the flow of material through said passage toward said outlet tends to move said mandrel toward said outlet, said mandrel and said die being of such configuration relative to one another that movement of said mandrel in said passage toward said outlet changes the size of the opening between the mandrel and outlet;
means forming a chamber;
a piston positioned for movement in said chamber, said piston engaging the walls of said chamber to divide the chamber into first and second regions;
means connecting said piston to said mandrel so that movement of said mandrel through said passage moves said piston through said chamber;
a source of hydraulic fluid; and
first and second conduit means connecting said source simultaneously to said first and second regions, respectively, whereby the reltaive sizes of the passages through said conduit means influence the force exerted on said piston tending to restrict movement thereof.
3. The apparatus of claim 2, further comprising adjustable valve means disposed in the conduit means which communicates with the chamber on the side of the piston from which fluid flows when the mandrel moves toward said outlet in the die.
4. The apparatus of claim 2, further comprising means forming a flow path between said first and second regions, and a check valve in said flow path to permit fluid flow toward the region of the chamber wherein pressure is exerted on the fluid therein in response to movement of the mandrel toward said outlet in said die.
5. Molding apparatus comprising:
a hollow mold of non-uniform cross-sectional internal area;
a die having a passage therein which extends from an inlet adapted to receive a thermoplastic material to an outlet through which thermoplastic material is extruded;
a mandrel positioned for movement within said passage, said mandrel being of such configuration that the flow of material through said passage toward said outlet tends to move said mandrel toward said outlet, said mandrel and said die being of such configuration relative to one another that movement of said mandrel in said passage toward said outlet changes the size of the opening between the mandrel and outlet;
means forming a chamber;
a piston positioned for movement in said chamber, said piston engaging the walls of said chamber to divide the chamber into first and second regions;
means connecting said piston to said mandrel so that movement of said mandrel through said passage moves said piston through said chamber;
a source of hydraulic fluid; and
first and second conduit means connecting said source simultaneously to said first and second regions, respectively, whereby the relative sizes of the passages through said conduit means influence the force exerted on said piston tending to restrict movement thereof.
6. Molding apparatus comprising:
a hollow mold of non-uniform cross-sectional internal area;
a die having a passage therein which extends from an inlet adapted to receive a thermoplastic material to an outlet through which thermoplastic material is extruded;
a mandrel positioned for movement within said passage, said mandrel and said die being of such con- figuration relative to one another that movement of said mandrel through said passage toward said outlet changes the size of the opening between said mandrel and said outlet, a portion of said mandrel within said passage having an increasing cross-sectional area in a direction extending toward said outlet so that the flow of thermoplastic material from said inlet to said outlet tends to move said mandrel toward said outlet;

means connected to said mandrel to exert a retarding force tending to resist movement of said mandrel toward said outlet responsive to the flow of thermoplastic material through said passage toward said outlet;

means forming a chamber;

a piston positioned for movement in said chamber, said piston engaging the walls of said chamber to divide the chamber into first and second regions;

means connecting said piston to said mandrel so that movement of said mandrel through said passage moves said piston through said chamber;

a source of hydraulic fluid; and first and second conduit means connecting said source simultaneously to said first and second regions, respectively, whereby the relative sizes of the passages through said conduit means influence the force exerted on said piston tending to restrict movement thereof.

References Cited by the Examiner

UNITED STATES PATENTS 3,019,481 2/1962 Negoro _____ 18—5
3,078,507 2/1963 Park _____ 18—14 X J. SPENCER OVERHOLSER, *Primary Examiner.*

MICHAEL V. BRINDISI, *Examiner.*